US012785334B2

(12) United States Patent
Lee

(10) Patent No.: US 12,785,334 B2
(45) Date of Patent: Nov. 3, 2026

(54) CABLE CONNECTING DEVICE WITH INCREASED GROUNDING EFFECT OF CONDUCTOR

(71) Applicant: James Cheng Lee, La Habra, CA (US)

(72) Inventor: James Cheng Lee, La Habra, CA (US)

( * ) Notice: Subject to any disclaimer, the term of this patent is extended or adjusted under 35 U.S.C. 154(b) by 323 days.

(21) Appl. No.: 18/761,421

(22) Filed: Jul. 2, 2024

(65) Prior Publication Data

US 2025/0246856 A1 Jul. 31, 2025

Related U.S. Application Data

(60) Provisional application No. 63/626,541, filed on Jan. 30, 2024.

(30) Foreign Application Priority Data

May 13, 2024 (CN) ......................... 202410589426.9

(51) Int. Cl.
*H01R 13/6595* (2011.01)
*H01R 13/66* (2006.01)

(52) U.S. Cl.
CPC ..... *H01R 13/6595* (2013.01); *H01R 13/6658* (2013.01)

(58) Field of Classification Search
CPC . H01R 13/6595; H01R 13/6658; H01R 24/20
See application file for complete search history.

(56) References Cited

U.S. PATENT DOCUMENTS 6,024,597 A * 2/2000 Lok .................... H01R 13/6593 439/402
7,955,132 B2 * 6/2011 Luo .................... H01R 13/6658 439/607.41
9,692,187 B2 * 6/2017 Qian ...................... H01R 12/53
10,148,050 B2 * 12/2018 Ma ....................... H01R 31/065
10,498,090 B2 * 12/2019 Wu .................... H01R 13/6593

* cited by examiner

*Primary Examiner* — Seung H Lee

(57) ABSTRACT

A cable connecting device with increased grounding effect of conductor, including: an outer housing, a metal shield, a printed circuit board, a connector, a front cover, a metal wire clip and a cable. The printed circuit board has a plurality of pads. The metal wire clip includes a first frame having a plurality of wire fixing parts. The cable has a plurality of ground wires respectively soldered to the wire fixing parts and the pads. Thereby, because the ground wires can contact and be soldered and fixed to the wire fixing parts, the ground wires can be stably in contact with the first frame of the metal wire clip, such that the ground wires can directly contact and be conducted with the first frame of the metal wire clip, which can increases the grounding effect of conductor to prevent electronic interference on signals.

6 Claims, 16 Drawing Sheets

CABLE CONNECTING DEVICE WITH INCREASED GROUNDING EFFECT OF CONDUCTOR

CROSS-REFERENCE TO RELATED APPLICATION

This application claims the priority of China patent application No. 202410589426.9, filed on May 13, 2024 and U.S. patent application No. 63/626,541, filed on Jan. 30, 2024, which is incorporated herewith by reference.

BACKGROUND OF THE INVENTION

1. Field of the Invention

The present invention relates to a cable connecting device, in particular to a cable connecting device with increased grounding effect of conductor.

2. The Prior Arts

In general electronic equipment, grounding is an important method to control interference. Most interference problems can be solved if grounding and metal shield are used by a correct combination. In the circuit design of electronic equipment, the chassis (i.e., metal shield) is mainly used as a ground wire to connect to the ground, so as to become a potential reference point inside the circuit. Grounding can also be regarded as a common return path for current (i.e., a ground loop).

The circuit of a conventional cable connecting device includes the following design considerations:

(1) The braided ground wire at the periphery of the raw cable and the auxiliary individual bare ground wire inside the cable are soldered to the pads on the printed circuit board, and then connected to the metal shield through the soldering pins in the USB Type-C connector, the metal shield is soldered to a metal wire clip at the rear end of the raw cable, and the metal wire clip is wrapped around the braided ground wire of the raw cable, thereby forming a ground loop.

(2) If the ground wire is very thin, the ground potential will change as the current changes, thereby causing the timing signal level of the electronic equipment to be unstable and the anti-noise performance to deteriorate. Therefore, it is common for users to make the ground wire as thick as possible such that the allowed current on the printed circuit board can pass through the ground wire.

(3) There are several integrated circuits on the printed circuit board, especially when there are components that consume more power, due to the limitation of the diameter of the ground wire, a large potential difference will be generated on the ground wire, thereby causing a decrease in anti-noise ability. Therefore, when the cable only has the ground wire system of printed circuit board composed of digital circuits, if the ground wire forms a closed loop, the value of the potential difference will be reduced and the anti-noise ability of the electronic equipment will be improved.

However, the ground wire is not fixed to the metal wire clip, and thus the ground wire cannot be stably in contact with the metal wire clip, thereby the ground wire cannot directly contact the metal wire clip and be conducted with the metal wire clip.

Furthermore, in conventional cable connecting devices, reducing of interference on signals is generally achieved by increasing the number or diameter of the ground wires, however, it causes that the cable connecting device is too stiff and difficult to be bent.

SUMMARY OF THE INVENTION

The main object of the present invention is to provide a cable connecting device with increased grounding effect of conductor, and the ground wires can contact and be soldered and fixed to the metal wire clip.

Another object of the present invention is to provide a cable connecting device with increased grounding effect of conductor without increasing the number or diameter of the ground wires.

In order to achieve the above objects, the present invention provides a cable connecting device with increased grounding effect of conductor, comprising an outer housing, a metal shield, a printed circuit board, a connector, a front cover, a metal wire clip and a cable. The metal shield is provided inside the outer housing. The printed circuit board is provided inside the metal shield and has a plurality of pads, wherein the pads are respectively arranged on a top surface and a bottom surface of the printed circuit board, and are close to two sides of a second end of the printed circuit board. The connector is provided at a first end of the metal shield, protrudes outward beyond a first end of the outer housing, and has a plurality of pins soldered to a first end of the printed circuit board. The front cover is provided at the first end of the metal shield and is located inside the first end of the outer housing. The metal wire clip is provided at a second end of the metal shield, and includes a first frame having a plurality of wire fixing parts and a second frame provided at one end of the first frame. One end of the cable passes through a second end of the outer housing, the cable is arranged inside the second frame, and has a plurality of ground wires respectively soldered to the wire fixing parts and the pads.

In some embodiments, a first end and/or a second end of two side walls of the first frame are bent inward and/or outward to form two sheet-shaped wire fixing parts, and each of the sheet-shaped wire fixing part is provided with two round holes, the ground wires respectively pass through the round holes and are soldered to hole walls of the round holes.

In some embodiments, two side walls of the first frame are recessed inward to form two groove-shaped wire fixing parts, and the ground wires respectively pass through the groove-shaped wire fixing parts and are soldered to groove walls of the groove-shaped wire fixing parts.

In some embodiments, two side walls of the first frame are press-punched outward to form four sheet-shaped wire fixing parts, and two of the ground wires are respectively soldered between two of the sheet-shaped wire fixing parts, the other two of the ground wires are soldered to top and bottom of the other two of the sheet-shaped wire fixing parts.

In some embodiments, one of the side walls of the first frame forms a flat plate-shaped wire fixing part, the other side wall of the first frame protrudes outward to form a bump-shaped wire fixing part, and two of the ground wires are respectively soldered to an outer side surface of the flat plate-shaped wire fixing part, the other two of the ground wires are respectively soldered to top and bottom of the bump-shaped wire fixing part.

In some embodiments, one of the side walls of the first frame forms an arc-shaped wire fixing part, the other side wall of the first frame protrudes outward to form a bump-shaped wire fixing part, and two of the ground wires are respectively soldered to an inner side surface of the arc-shaped wire fixing part, the other two of the ground wires are respectively soldered to top and bottom of the bump-shaped wire fixing part.

The effect of the present invention is that because the ground wires can contact and be soldered and fixed to the wire fixing parts, the ground wires can be stably in contact with the first frame of the metal wire clip, such that the ground wires can directly contact the first frame of the metal wire clip and be conducted with the first frame of the metal wire clip, which can increases the grounding effect of conductor to prevent electronic interference on signals.

Furthermore, the cable connecting device of the present invention provides a novel ground loop, which can reduce the number of serial connected parts required for the ground loop, greatly reduce the contact resistance, and more effectively solve the problem of interference on signal transmission on the cable. Therefore, the interference on the signal can be reduced without increasing the number or diameter of the ground wires, making the cable be more flexible and easier be bent.

DETAILED DESCRIPTION OF THE PREFERRED EMBODIMENT

Figure 1:
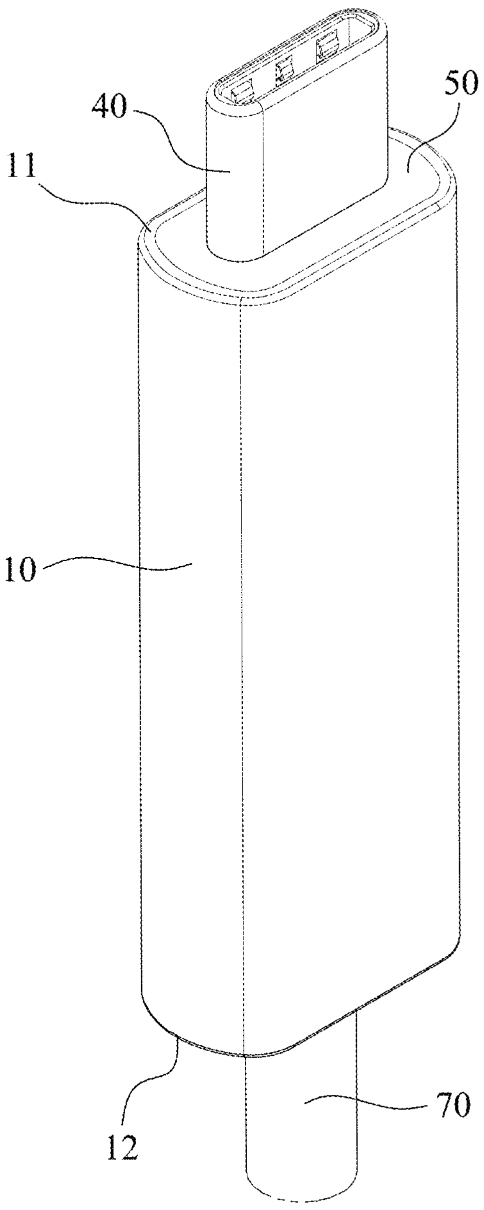
FIG. 1 is a perspective view of a cable connecting device of a first embodiment of the present invention.

Herein after, a more detailed description of the implementations of the present invention is made with reference to drawings and reference numerals, in order that those skilled in the art can implement them after studying this specification.

Figure 2:
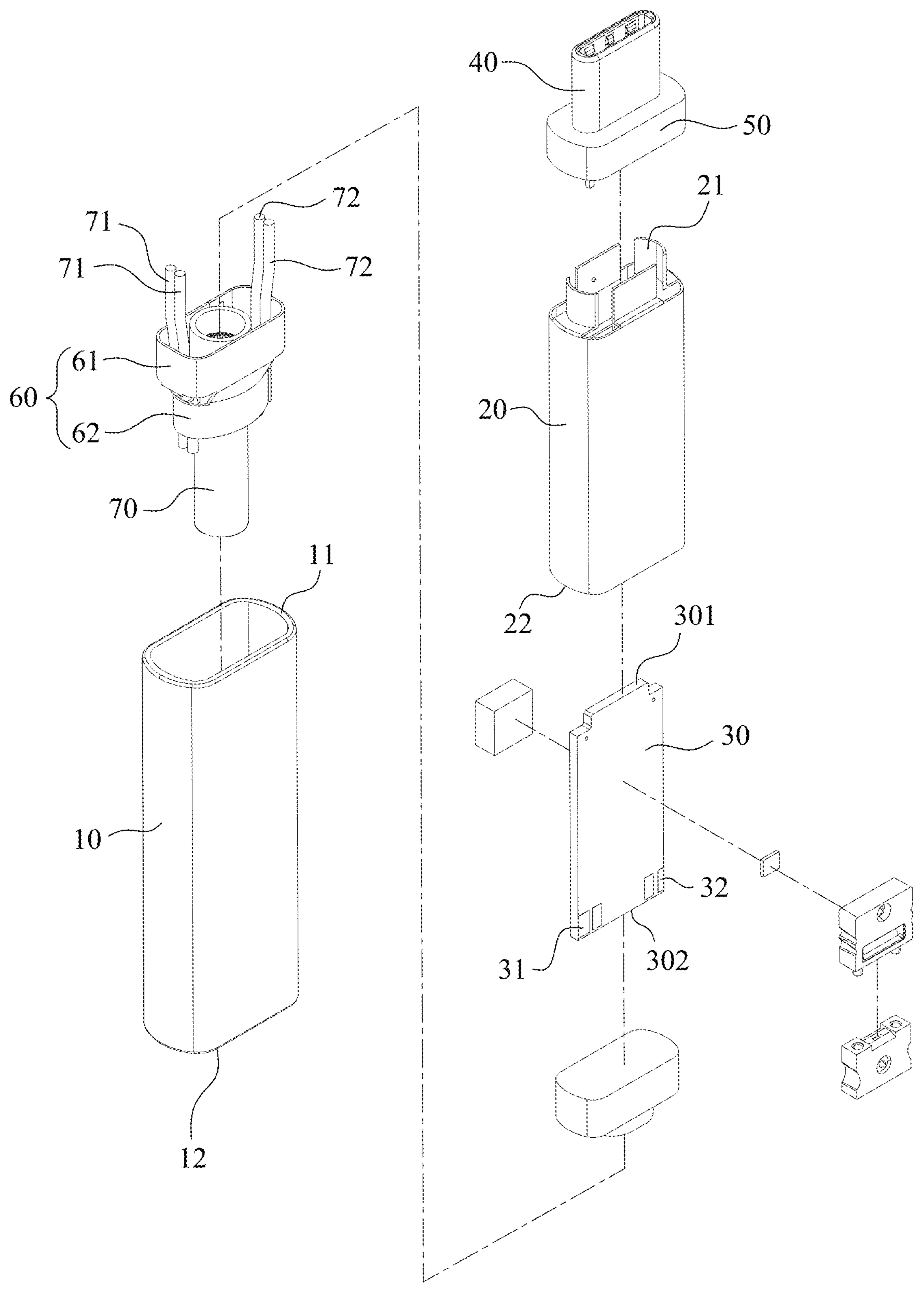
FIG. 2 is an exploded view of the cable connecting device of the first embodiment of the present invention.
Figure 3:
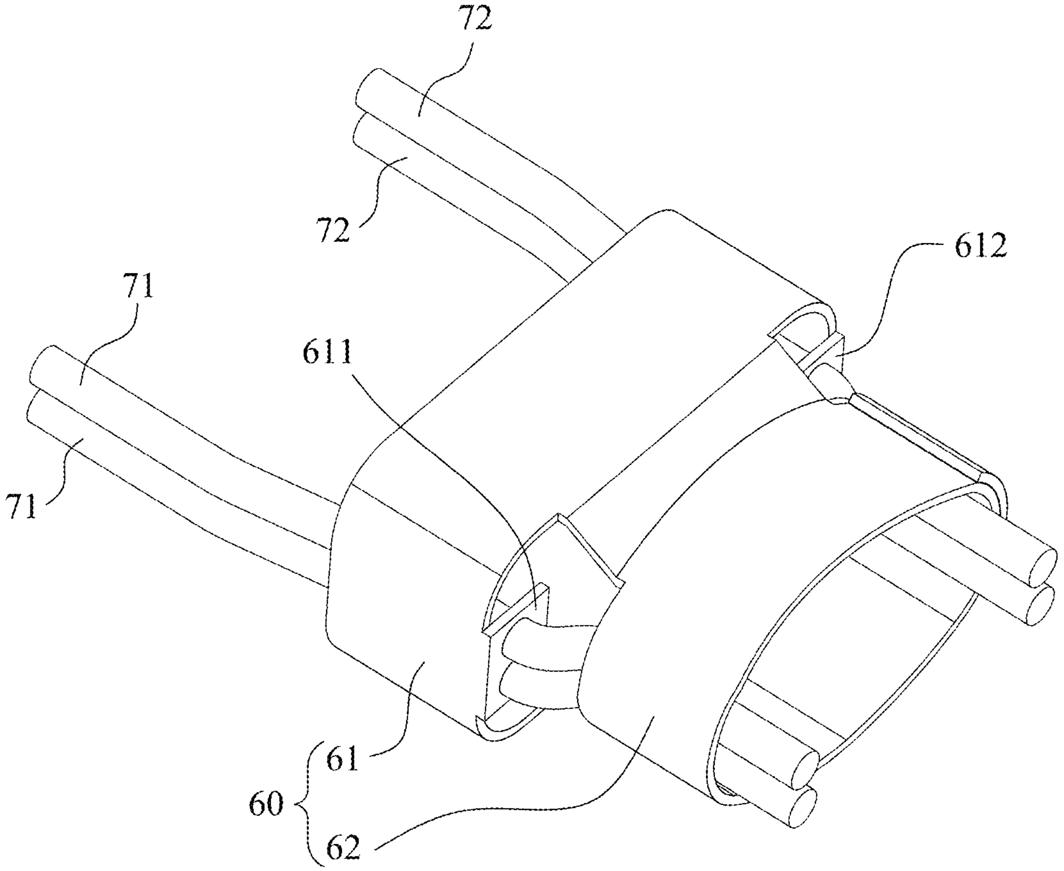
FIG. 3 is a perspective view of a metal wire clip and ground wires of the cable connecting device of the first embodiment of the present invention.
Figure 4:
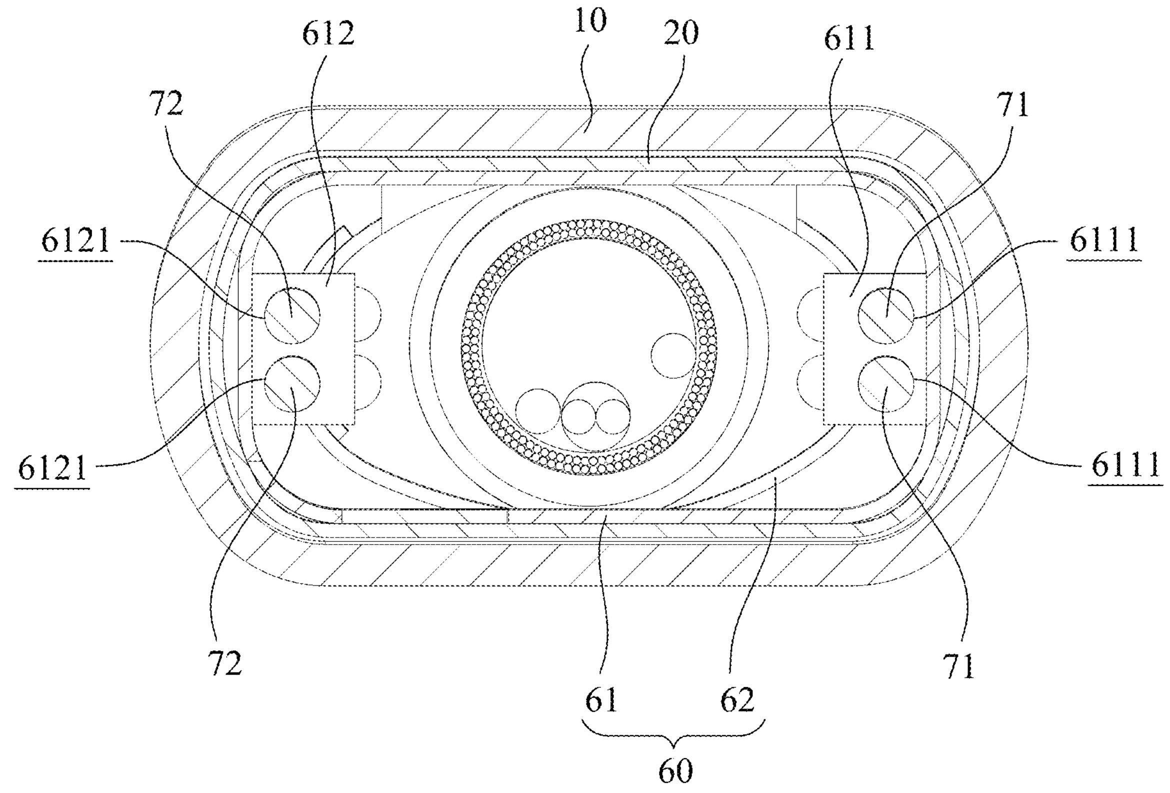
FIG. 4 is a cross-sectional view of the cable connecting device of the first embodiment of the present invention.
Figure 5:
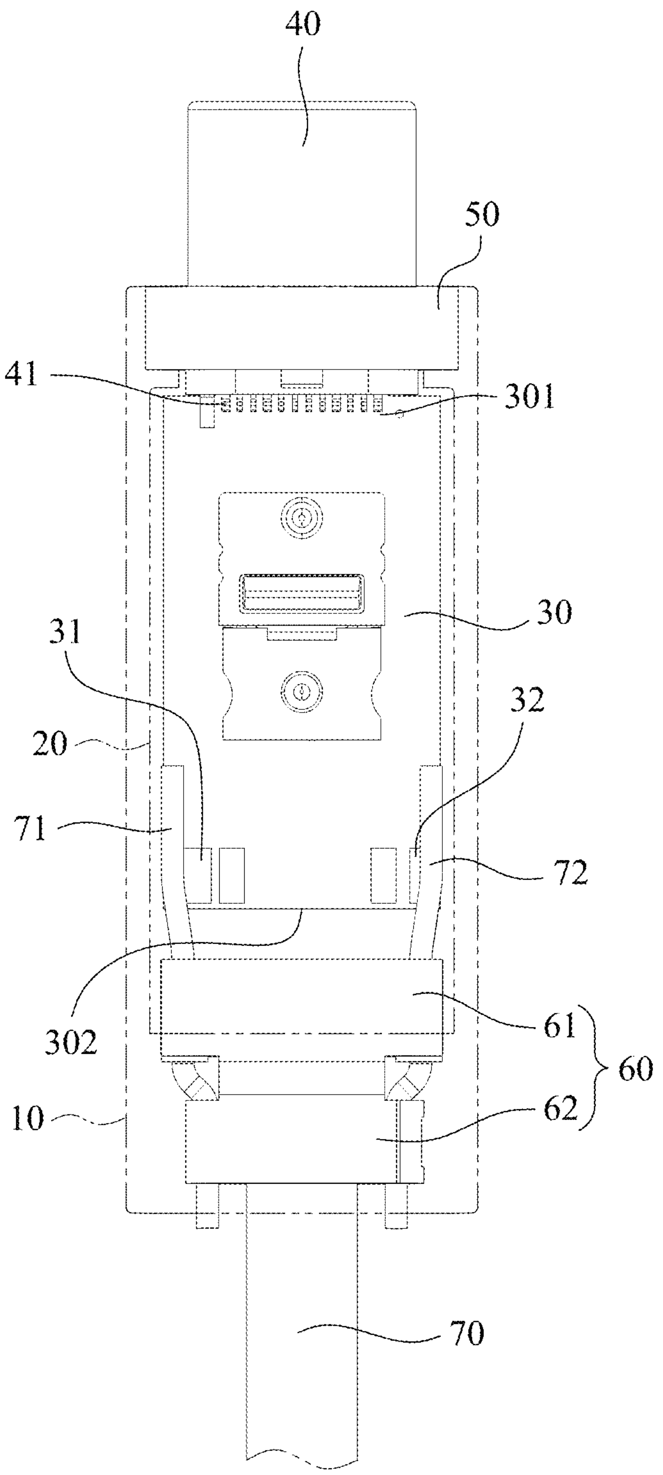
FIG. 5 is a top view of the cable connecting device of the first embodiment of the present invention.
Figure 6:
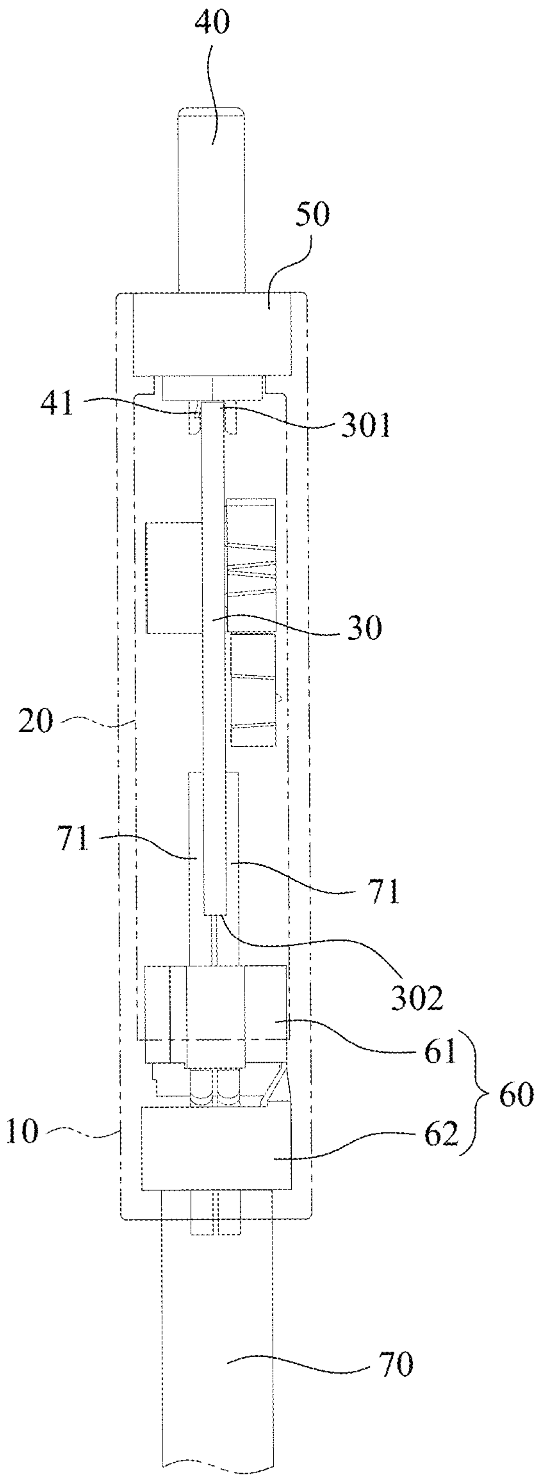
FIG. 6 is a side view of the cable connecting device of the first embodiment of the present invention.

FIG. 1 is a perspective view of a cable connecting device of a first embodiment of the present invention. FIG. 2 is an exploded view of the cable connecting device of the first embodiment of the present invention. FIG. 3 is a perspective view of a metal wire clip 60 and ground wires 71 and 72 of the cable connecting device of the first embodiment of the present invention. FIG. 4 is a cross-sectional view of the cable connecting device of the first embodiment of the present invention. FIG. 5 is a top view of the cable connecting device of the first embodiment of the present invention. FIG. 6 is a side view of the cable connecting device of the first embodiment of the present invention. As shown in FIGS. 1 to 6, the present invention provides a cable connecting device with increased grounding effect of conductor, comprising an outer housing 10, a metal shield 20, a printed circuit board 30, a connector 40, a front cover 50, a metal wire clip 60 and a cable 70. The metal shield 20 is provided inside the outer housing 10. The printed circuit board 30 is provided inside the metal shield 20 and has a plurality of pads 31 and 32, wherein the pads 31 and 32 are arranged on a top surface and a bottom surface of the printed circuit board 30, and are close to two sides of a second end 302 of the printed circuit board 30. The connector 40 is provided at a first end 21 of the metal shield 20, protrudes outward beyond a first end 11 of the outer housing 10, and has a plurality of pins 41 soldered to a first end 301 of the printed circuit board 30. The front cover 50 is provided at the first end 21 of the metal shield 20 and is located inside the first end 11 of the outer housing 10. The metal wire clip 60 is provided at a second end 22 of the metal shield 20, and includes a first frame 61 having a plurality of wire fixing parts 611 and 612 and a second frame 62 provided at one end of the first frame 61. One end of the cable 70 passes through a second end 12 of the outer housing 10, the cable 70 is arranged inside the second frame 62, and has a plurality of ground wires 71 and 72, the ground wires 71 and 72 are respectively soldered to the wire fixing parts 611 and 612 and the pads 31 and 32.

Thereby, because the ground wires 71 and 72 can contact and be soldered and fixed to the wire fixing parts 611 and 612, the ground wires 71 and 72 can be stably in contact with the first frame 61 of the metal wire clip 60, such that the ground wires 71 and 72 can directly contact the first frame 61 of the metal wire clip 60 and be conducted with the first frame 61 of the metal wire clip 60, which can increases the grounding effect of conductor to prevent electronic interference on signals.

The two ground loops of the cable connecting device of the present invention will be further described below.

The sequence of the first ground loop is: (1) the ground wires 71 and 72 of the cable 70; (2) the printed circuit board 30; (3) the pins 41 of the connector 40; (4) the first end 21 of the metal shield 20; (5) the side wall of the metal shield 20; (6) the metal wire clip 60; and (7) the braided ground wires inside the cable 70 (not shown).

The sequence of the second ground loop is: (1) the ground wires 71 of the cable 70 arranged at the left side of the printed circuit board 30; (2) the printed circuit board 30; (3) the pins 41 of the connector 40; (4) the first end 21 of the metal shield 20; (5) the side wall of the metal shield 20; (6) the metal wire clip 60; and (7) the ground wires 72 of the cable 70 arrange at the right side of the printed circuit board 30.

In this way, the cable connecting device of the present invention provides a novel ground loop (i.e., the second ground loop), which can reduce the number of serial connected parts required for the ground loop, greatly reduce the contact resistance, and more effectively solve the problem of interference on signal transmission on the cable 70. Therefore, the interference on the signal can be reduced without increasing the number or diameter of the ground wires, making the cable 70 be more flexible and easier be bent.

As shown in FIGS. 3 and 4, in the first embodiment, seconds end of two side walls of the first frame 61 are bent inward to form two sheet-shaped wire fixing parts 611 and 612, and each of the sheet-shaped wire fixing parts 611 and 612 is provided with two round holes 6111 and 6121. The ground wires 71 and 72 respectively pass through the round holes 6111 and 6121 and are soldered to the hole walls of the round holes 6111 and 6121.

Thereby, the round holes 6111 and 6121 have shapes corresponding to the shapes of the ground wires 71 and 72, such that the ground wires 71 and 72 can easily pass through the round holes 6111 and 6121 and be soldered and fixed in the round holes 6111 and 6121.

Furthermore, the first frame 61 is easily bent to form the wire fixing parts 611 and 612.

Figure 7:
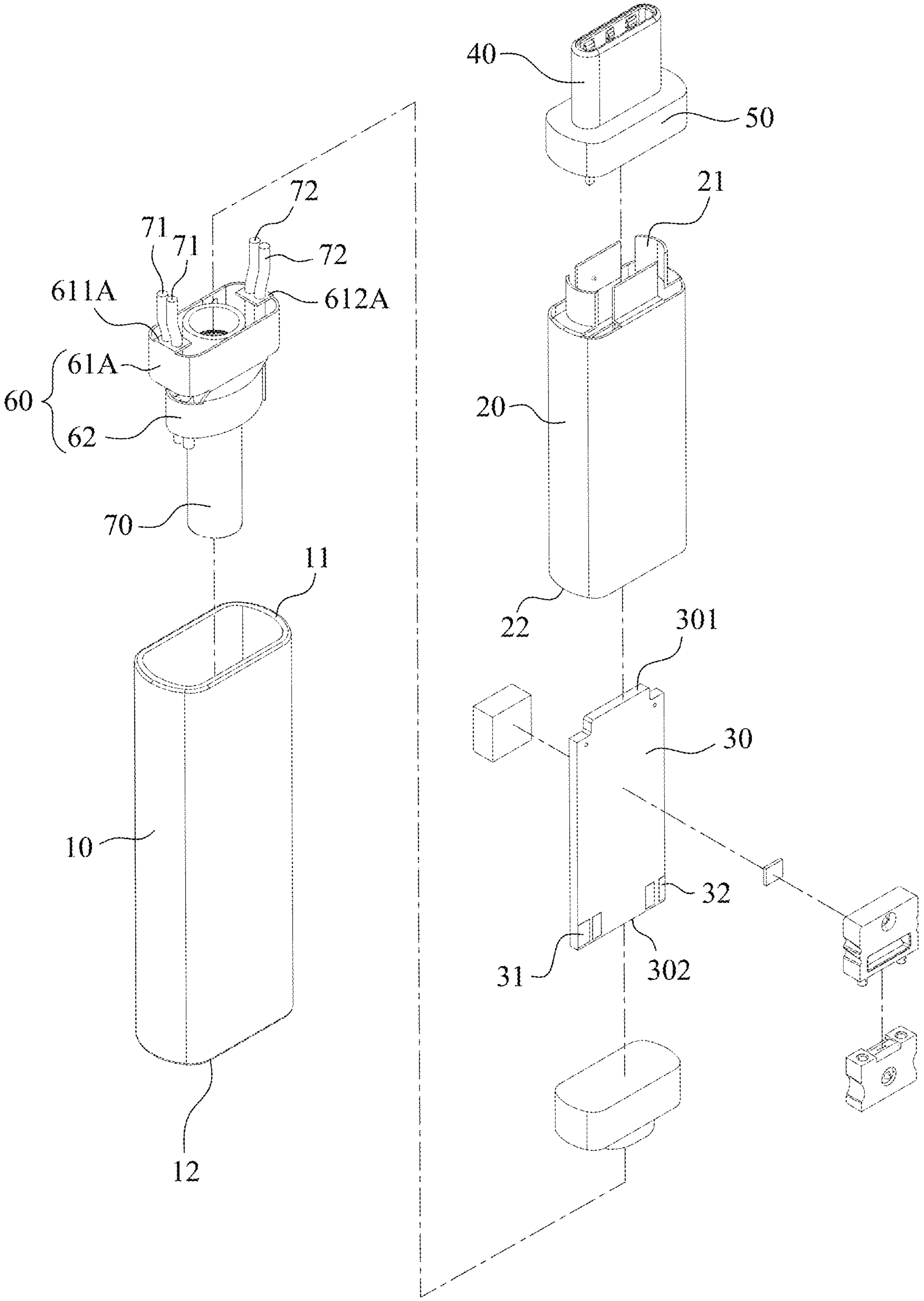
FIG. 7 is an exploded view of a cable connecting device of a second embodiment of the present invention.
Figure 8:
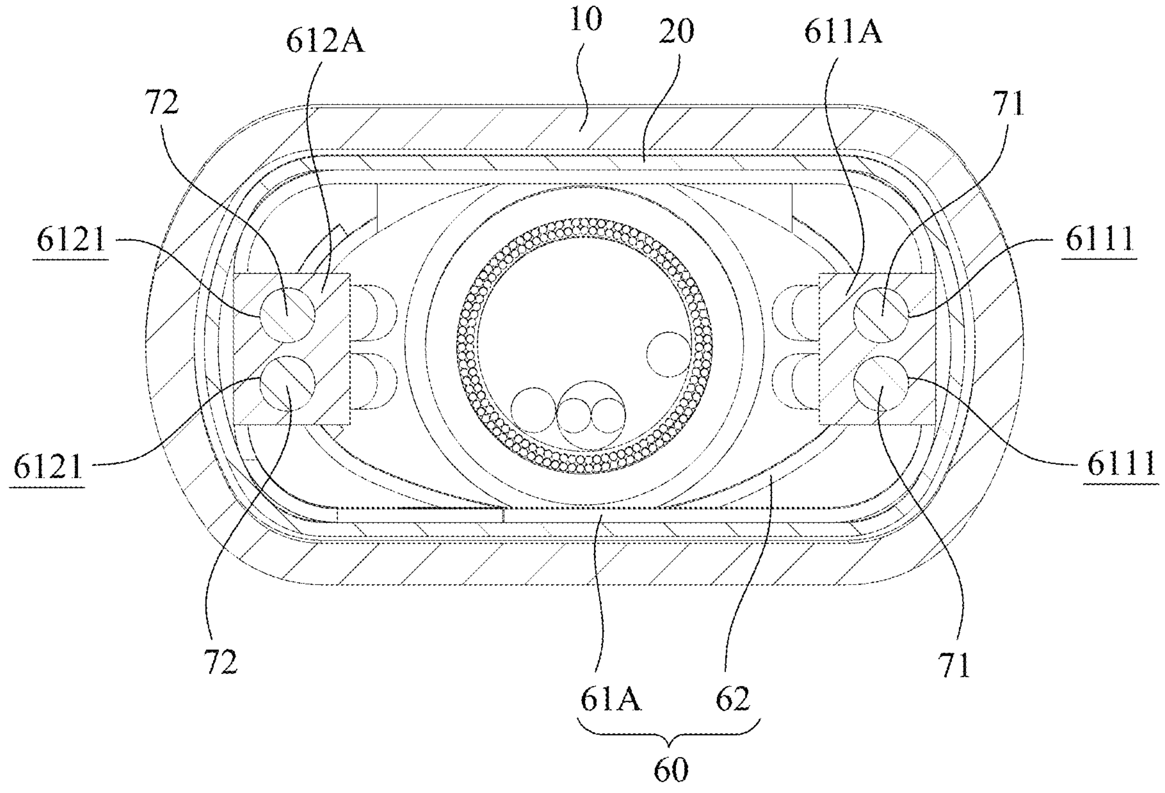
FIG. 8 is a cross-sectional view of the cable connecting device of the second embodiment of the present invention.

FIG. 7 is an exploded view of a cable connecting device of a second embodiment of the present invention. FIG. 8 is a cross-sectional view of the cable connecting device of the second embodiment of the present invention. As shown in FIGS. 7 and 8, the second embodiment is different from the first embodiment in that first ends of two side walls of a first frame 61A are bent inward to form two sheet-shaped wire fixing parts 611A and 612A.

In some embodiments, second ends of the two side walls of the first frame 61A are bent outward to form two sheet-shaped wire fixing parts 611 and 612.

In some embodiments, the first ends of the two side walls of the first frame 61A are bent outward to form two sheet-shaped wire fixing parts 611A and 612A.

In some embodiments, the second end of one of the side walls of the first frame 61A is bent outward to form one sheet-shaped wire fixing part 611, and the first end of the other side wall of the first frame 61A is bent inward to form one sheet-shaped wire fixing part 612A.

In some embodiments, the second end of one of the side walls of the first frame 61A is bent inward to form one sheet-shaped wire fixing part 611, and the first end of the other side wall of the first frame 61A is bent outward to form one sheet-shaped wire fixing part 612A.

Figure 9:
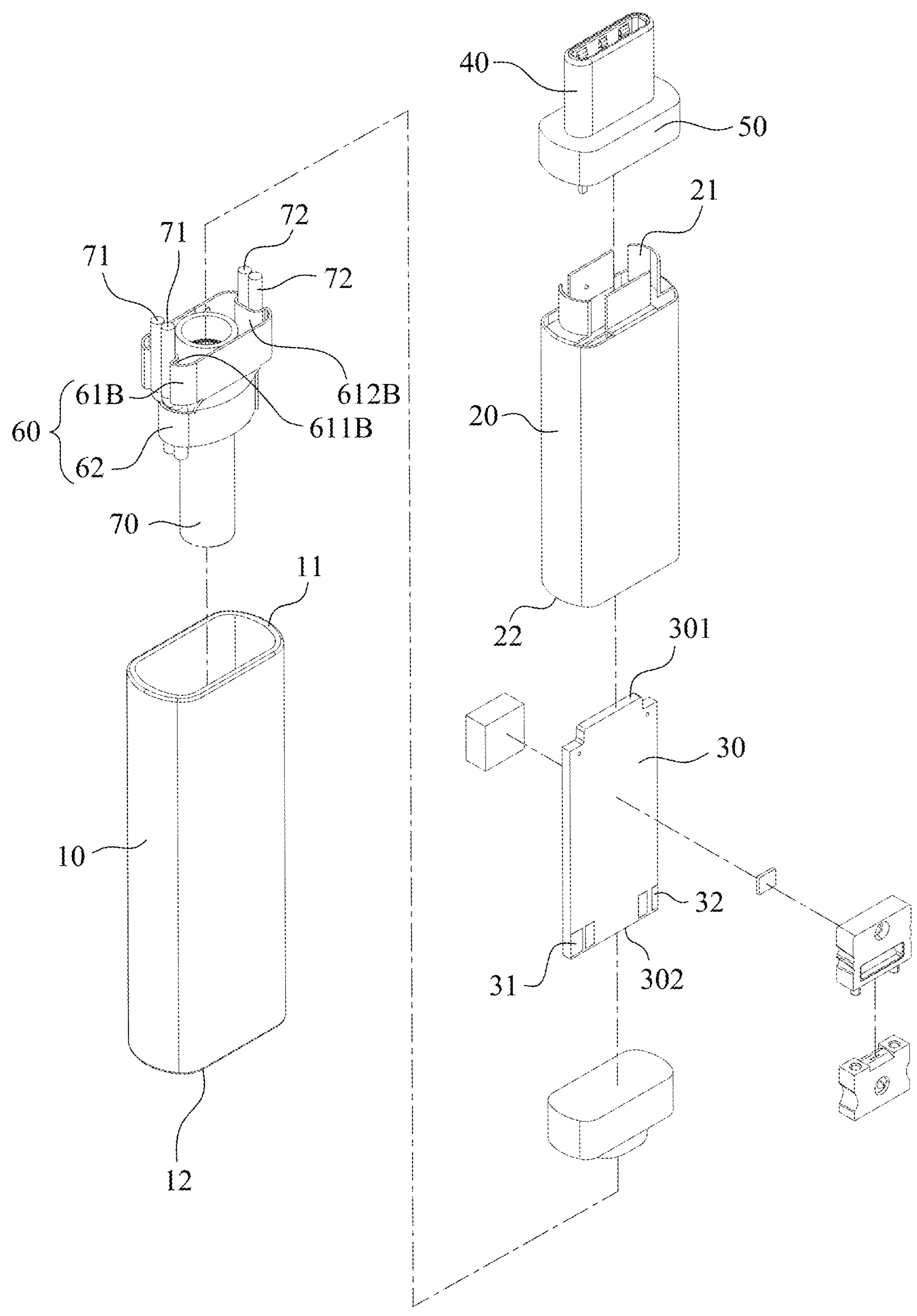
FIG. 9 is an exploded view of a cable connecting device of a third embodiment of the present invention.
Figure 10:
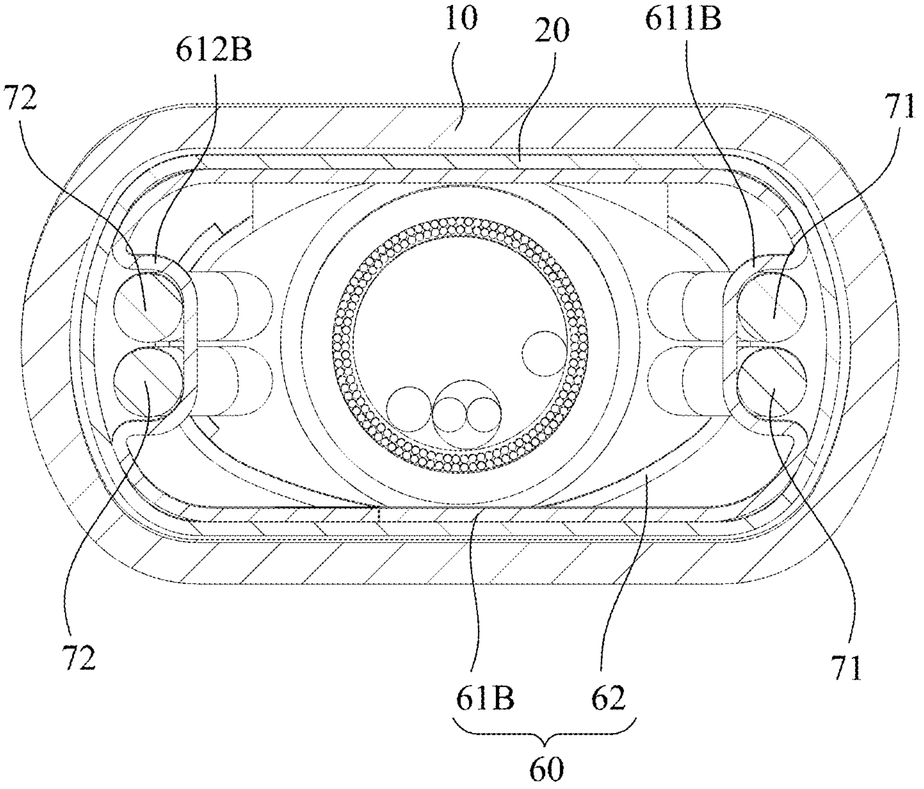
FIG. 10 is a cross-sectional view of the cable connecting device of the third embodiment of the present invention.

FIG. 9 is an exploded view of a cable connecting device of a third embodiment of the present invention. FIG. 10 is a cross-sectional view of the cable connecting device of the third embodiment of the present invention. As shown in FIGS. 9 and 10, the third embodiment is different from the previous embodiments in that two side walls of a first frame 61B are recessed inward to form two groove-shaped wire fixing parts 611B and 612B, and the ground wires 71 and 72 respectively pass through the groove-shaped wire fixing parts 611B and 612B and are soldered to the groove walls of the groove-shaped wire fixing parts 611B and 612B.

In this way, the wire fixing parts 611B and 612B are groove-shaped, thereby achieving the following effects: first, the ground wires 71 and 72 can quickly pass through the groove-shaped wire fixing parts 611B and 612B, which is easy to operate and saves assembly time; second, the groove-shaped wire fixing parts 611B and 612B have a large soldering area, which enhances the effect of soldering and fixing the ground wires 71 and 72 to the groove-shaped wire fixing parts 611B and 612B.

Figure 11:
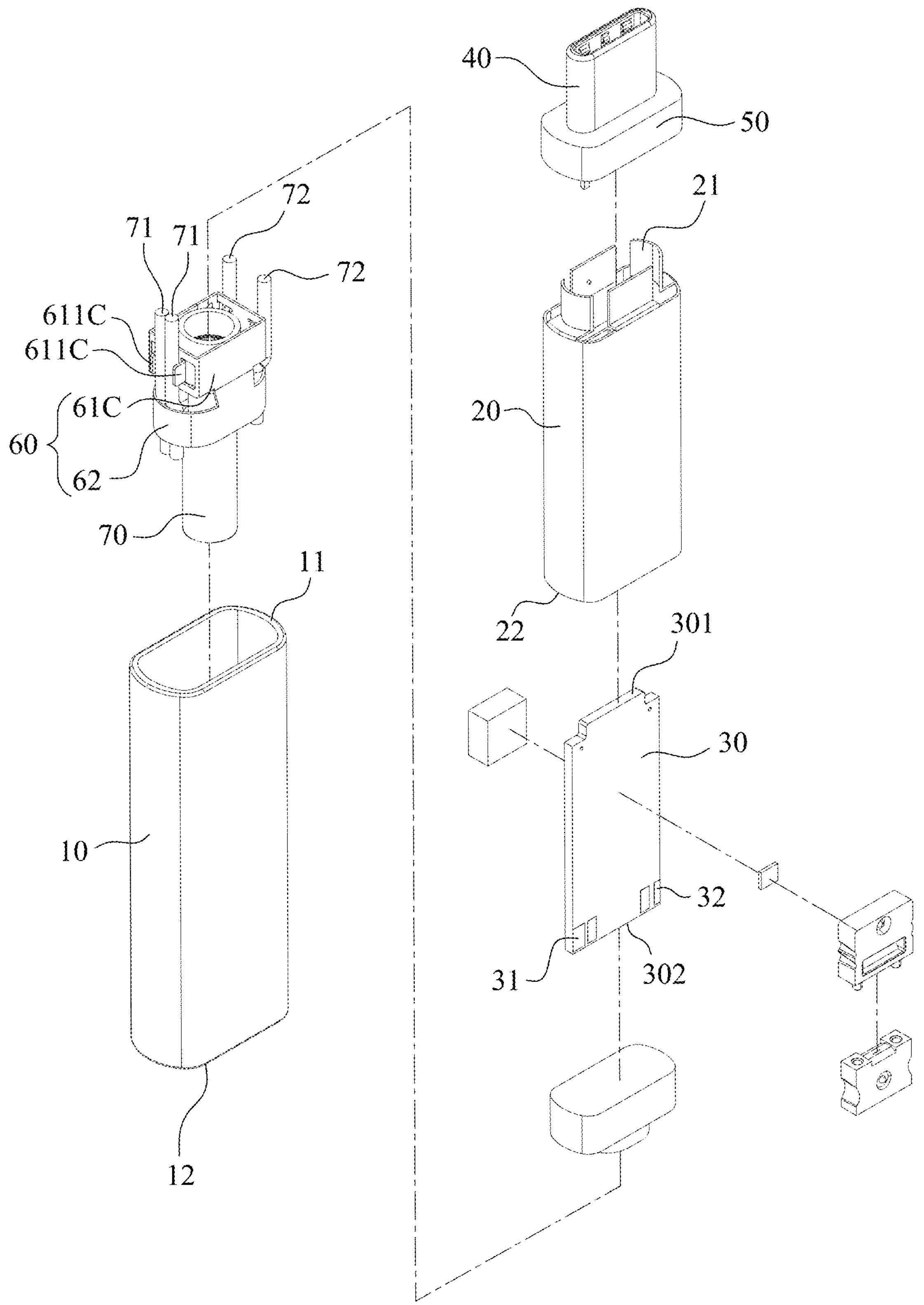
FIG. 11 is an exploded view of a cable connecting device of a fourth embodiment of the present invention.
Figure 12:
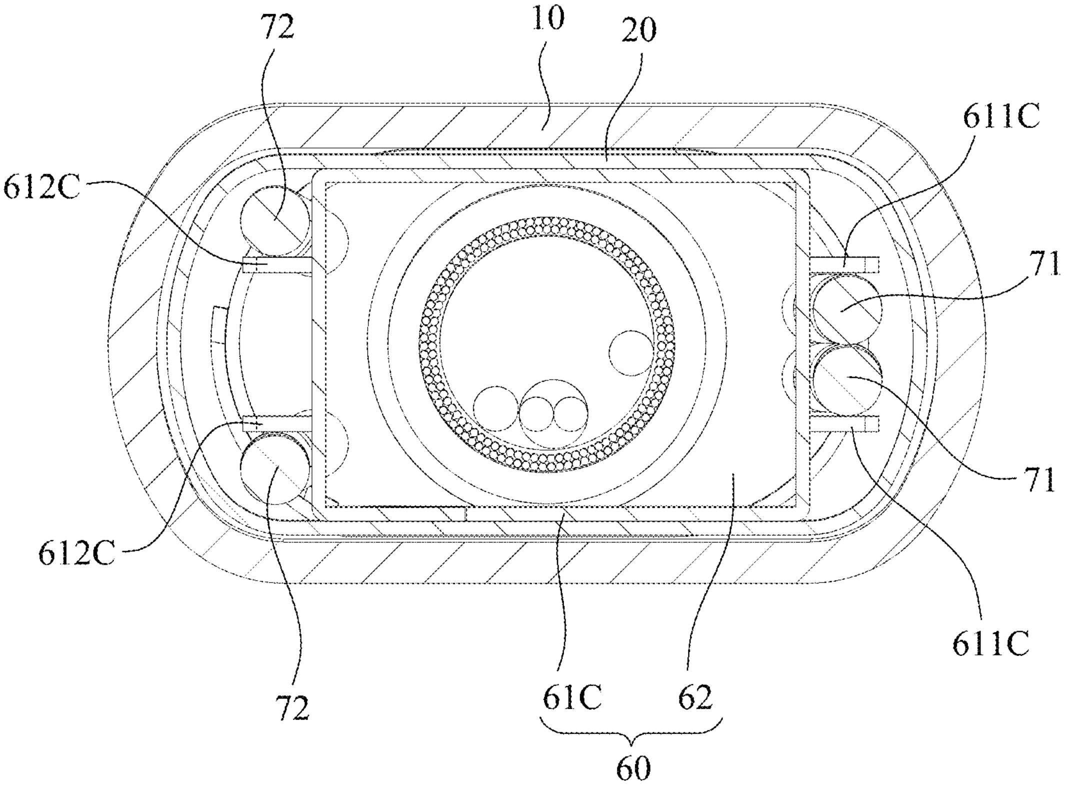
FIG. 12 is a cross-sectional view of the cable connecting device of the fourth embodiment of the present invention.

FIG. 11 is an exploded view of a cable connecting device of a fourth embodiment of the present invention. FIG. 12 is a cross-sectional view of the cable connecting device of the fourth embodiment of the present invention. As shown in FIGS. 11 and 12, the fourth embodiment is different from the previous embodiments in that two side walls of a first frame 61C are press-punched outward to form four sheet-shaped wire fixing parts 611C and 612C, and the ground wires 71 are soldered between the sheet-shaped wire fixing parts 611C, the ground wires 72 are respectively soldered to top and bottom (from a view angle of FIG. 12) of the sheet-shaped wire fixing parts 612C.

Thereby, the ground wires 71 and 72 can be quickly soldered and fixed to the sheet-shaped wire fixing parts 611C and 612C, which is easy to operate and saves assembly time.

Furthermore, the first frame 61C can be easily press-punched to form the wire fixing parts 611C and 612C.

Figure 13:
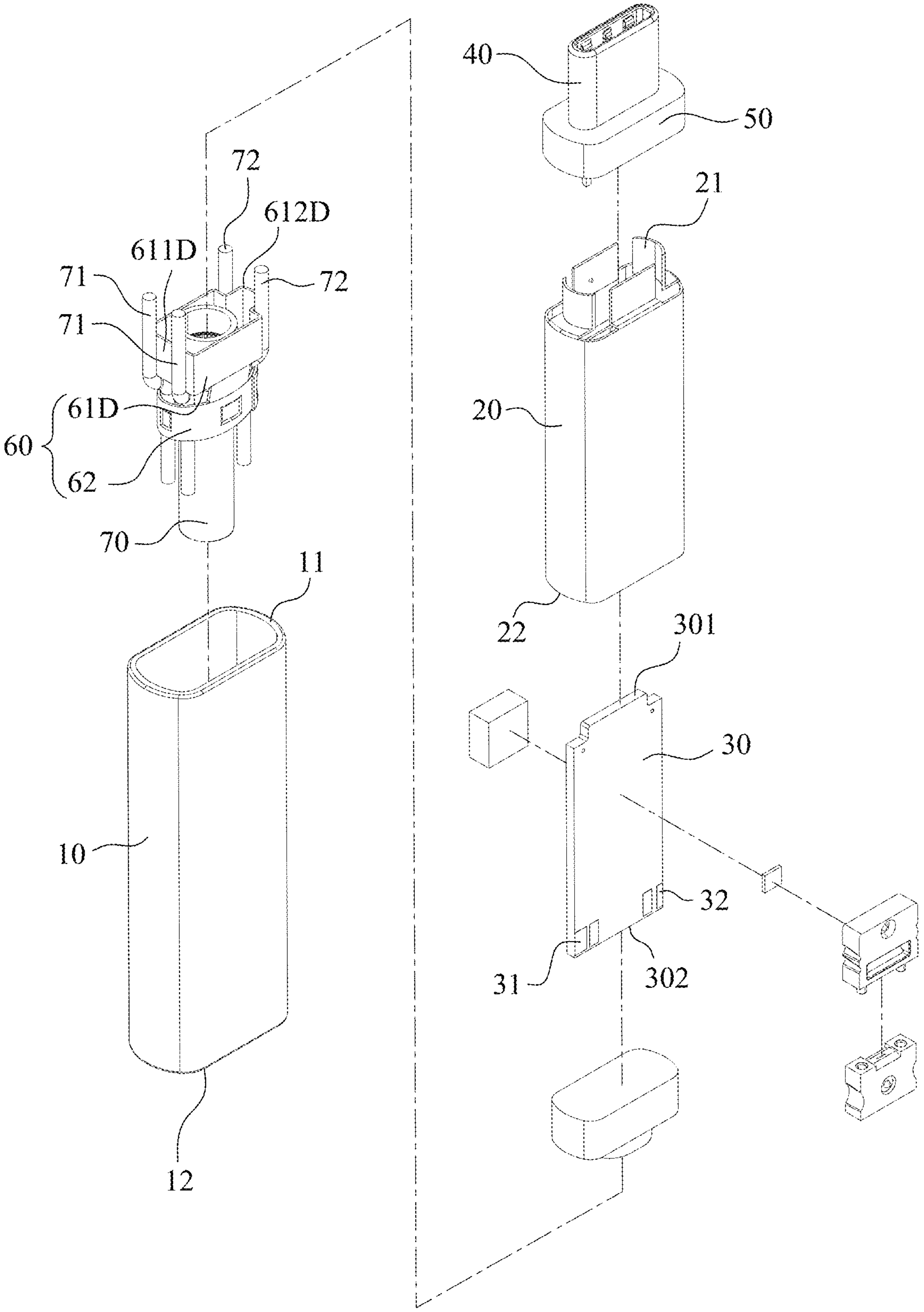
FIG. 13 is an exploded view of a cable connecting device of a fifth embodiment of the present invention.
Figure 14:
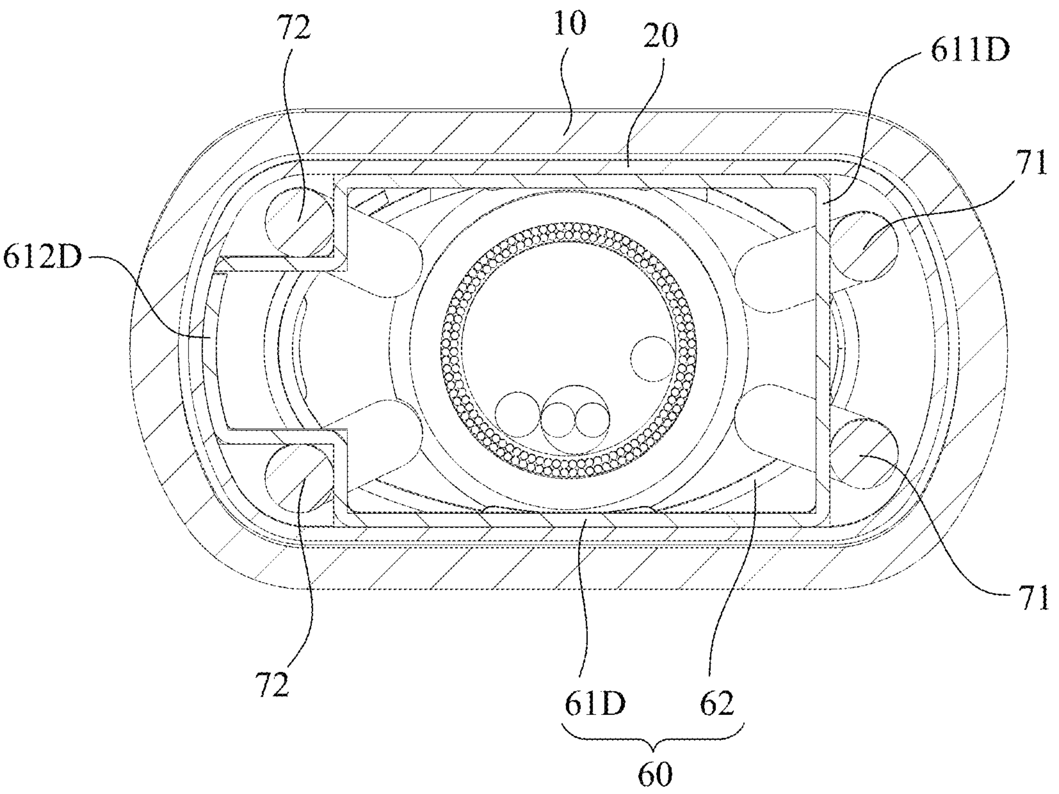
FIG. 14 is a cross-sectional view of the cable connecting device of the fifth embodiment of the present invention.

FIG. 13 is an exploded view of a cable connecting device of a fifth embodiment of the present invention. FIG. 14 is a cross-sectional view of the cable connecting device of the fifth embodiment of the present invention. As shown in FIGS. 13 and 14, the fifth embodiment is different from the previous embodiments in that one of the side walls of a first frame 61D forms a flat plate-shaped wire fixing part 611D, the other side wall of the first frame 61D protrudes outward to form a bump-shaped wire fixing part 612D, and the ground wires 71 are respectively soldered to the outer side surface of the flat plate-shaped wire fixing part 611D, the ground wires 72 are respectively soldered to top and bottom (from a view angle of FIG. 14) of the bump-shaped wire fixing part 612D.

Thereby, the ground wires 71 and 72 can achieve the effect of organizing the wires through the flat plate-shaped wire fixing part 611D and the bump-shaped wire fixing part 612D.

Furthermore, the ground wires 71 and 72 can be quickly soldered and fixed to the flat plate-shaped wire fixing part 611D and the bump-shaped wire fixing part 612D, which is easy to operate and saves assembly time.

Figure 15:
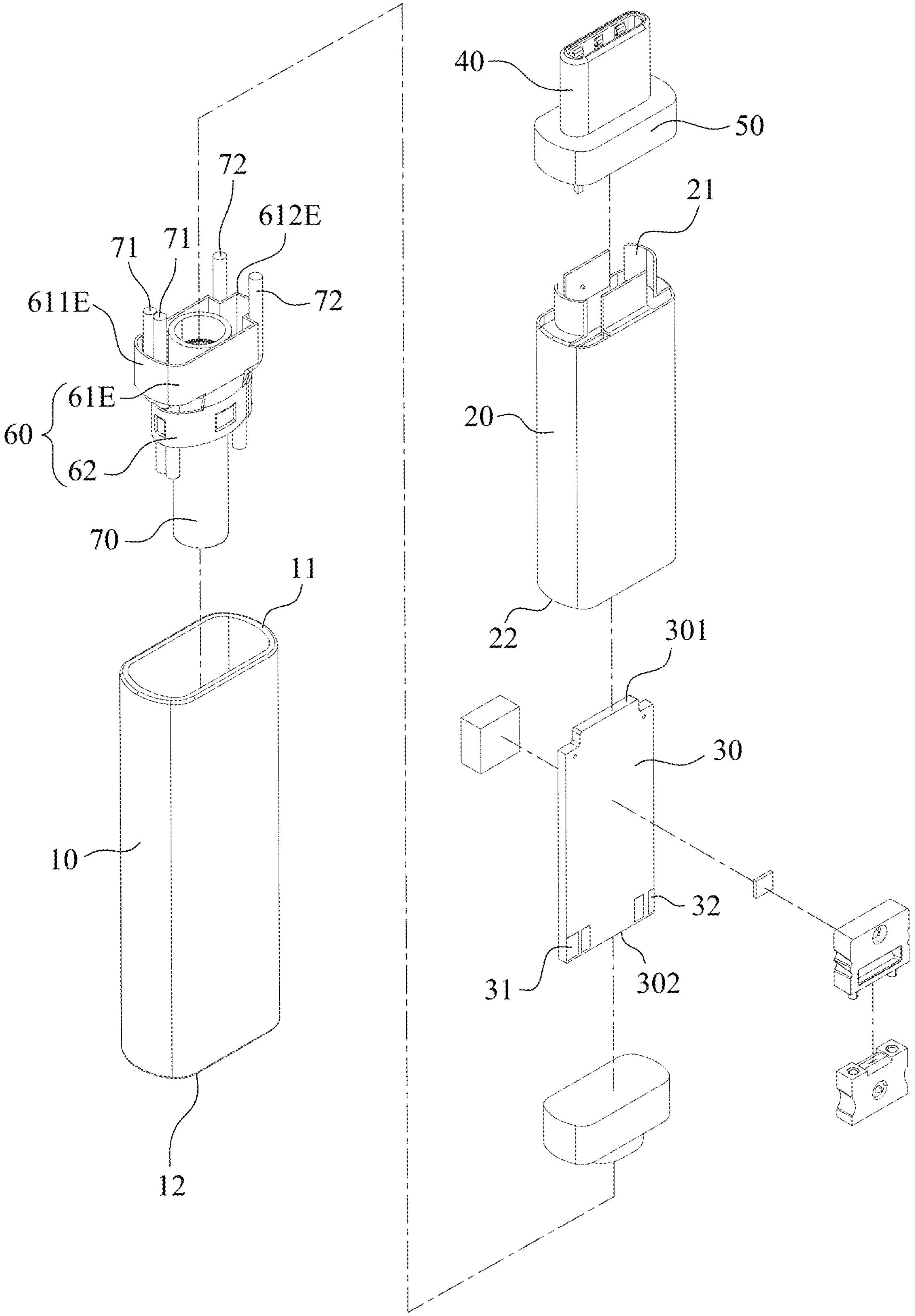
FIG. 15 is an exploded view of a cable connecting device of a sixth embodiment of the present invention.
Figure 16:
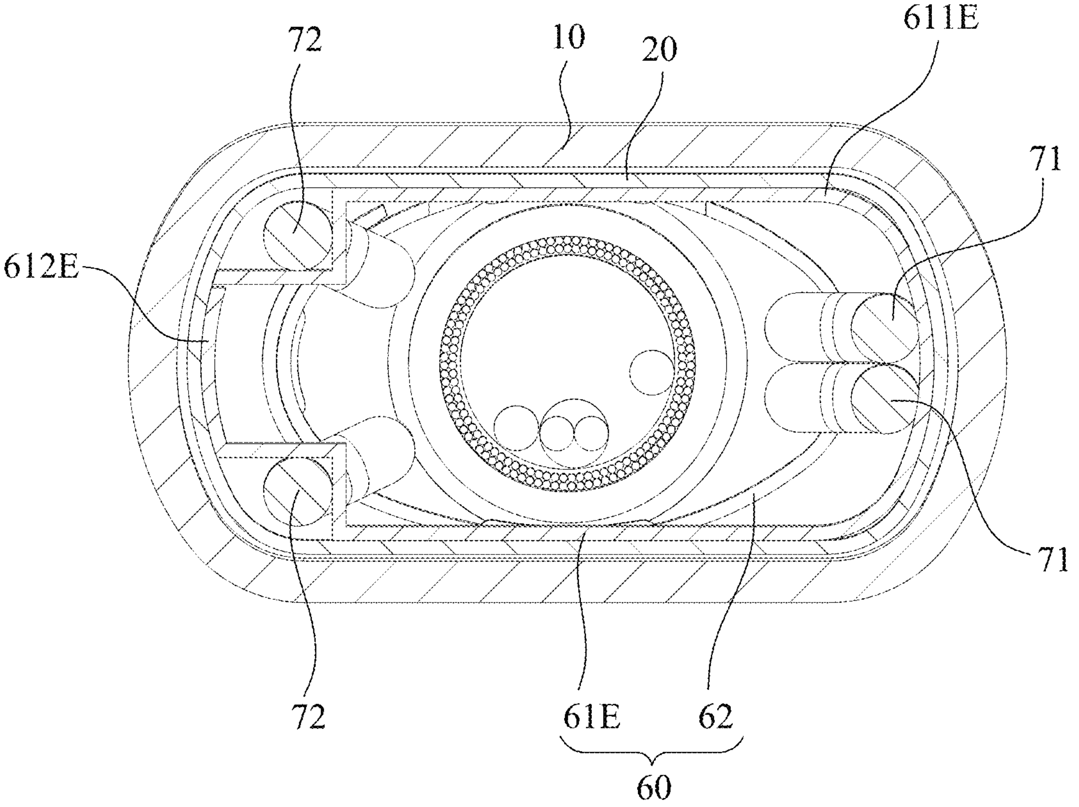
FIG. 16 is a cross-sectional view of the cable connecting device of the sixth embodiment of the present invention.

FIG. 15 is an exploded view of a cable connecting device of a sixth embodiment of the present invention. FIG. 16 is a cross-sectional view of the cable connecting device of the sixth embodiment of the present invention. As shown in FIGS. 15 and 16, the sixth embodiment is different from the previous embodiments in that one of the side walls of a first frame 61E forms an arc-shaped wire fixing part 611E, the other side wall of the first frame 61E protrudes outward to form a bump-shaped wire fixing part 612E, and the ground wires 71 are respectively soldered to the inner side surface of the arc-shaped wire fixing part 611E, the ground wires 72 are respectively soldered to top and bottom (from a view angle of FIG. 16) of the bump-shaped wire fixing part 612E.

Thereby, the ground wires 71 and 72 can achieve the effect of organizing the wires through the arc-shaped wire fixing part 611E and the bump-shaped wire fixing part 612E.

Furthermore, the ground wires 71 and 72 can be quickly soldered and fixed to the arc-shaped wire fixing part 611E and the bump-shaped wire fixing part 612E, which is easy to operate and saves assembly time.

Those mentioned above are only used to explain the preferred embodiments of the present invention, and are not intended to limit the present invention in any form. Therefore, any modifications or changes to the present invention made under the same creative spirit should still be included in the scope to be protected of the present invention.

What is claimed is:

1. A cable connecting device with increased grounding effect of conductor, comprising:

an outer housing;

a metal shield provided inside the outer housing;

a printed circuit board provided inside the metal shield and having a plurality of pads, wherein the pads are respectively arranged on a top surface and a bottom surface of the printed circuit board, and are close to two sides of a second end of the printed circuit board;

a connector provided at a first end of the metal shield, protruding outward beyond a first end of the outer housing, and having a plurality of pins soldered to a first end of the printed circuit board;

a front cover provided at the first end of the metal shield and located inside the first end of the outer housing;

a metal wire clip provided at a second end of the metal shield, and including a first frame having a plurality of wire fixing parts and a second frame provided at one end of the first frame; and a cable, one end of which passes through a second end of the outer housing, the cable is arranged inside the second frame, and has a plurality of ground wires respectively soldered to the wire fixing parts and the pads.

2. The cable connecting device according to claim 1, wherein a first end and/or a second end of two side walls of the first frame are bent inward and/or outward to form two sheet-shaped wire fixing parts, and each of the sheet-shaped wire fixing part is provided with two round holes, the ground wires respectively pass through the round holes and are soldered to hole walls of the round holes.

3. The cable connecting device according to claim 1, wherein two side walls of the first frame are recessed inward to form two groove-shaped wire fixing parts, and the ground wires respectively pass through the groove-shaped wire fixing parts and are soldered to groove walls of the groove-shaped wire fixing parts.

4. The cable connecting device according to claim 1, wherein two side walls of the first frame are press-punched outward to form four sheet-shaped wire fixing parts, and two of the ground wires are respectively soldered between two of the sheet-shaped wire fixing parts, the other two of the ground wires are soldered to top and bottom of the other two of the sheet-shaped wire fixing parts.

5. The cable connecting device according to claim 1, wherein one of the side walls of the first frame forms a flat plate-shaped wire fixing part, the other side wall of the first frame protrudes outward to form a bump-shaped wire fixing part, and two of the ground wires are respectively soldered to an outer side surface of the flat plate-shaped wire fixing part, the other two of the ground wires are respectively soldered to top and bottom of the bump-shaped wire fixing part.

6. The cable connecting device according to claim 1, wherein one of the side walls of the first frame forms an arc-shaped wire fixing part, the other side wall of the first frame protrudes outward to form a bump-shaped wire fixing part, and two of the ground wires are respectively soldered to an inner side surface of the arc-shaped wire fixing part, the other two of the ground wires are respectively soldered to top and bottom of the bump-shaped wire fixing part.

* * * * *